United States Patent
Bouffard et al.

(10) Patent No.: US 12,363,114 B2
(45) Date of Patent: *Jul. 15, 2025

(54) SYSTEM AND METHOD FOR AUTHENTICATING CLIENT DEVICES COMMUNICATING WITH AN ENTERPRISE SYSTEM

(71) Applicant: The Toronto-Dominion Bank, Toronto (CA)

(72) Inventors: Christian Joseph Bouffard, Whitby (CA); Saeed Alhajyousef, Burlington (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/666,296

(22) Filed: May 16, 2024

(65) Prior Publication Data
US 2024/0305635 A1  Sep. 12, 2024

Related U.S. Application Data

(63) Continuation of application No. 17/401,602, filed on Aug. 13, 2021, now Pat. No. 12,015,607.

(51) Int. Cl.
*H04L 29/06* (2006.01)
*H04L 9/40* (2022.01)

(52) U.S. Cl.
CPC ...... *H04L 63/0876* (2013.01); *H04L 63/0435* (2013.01); *H04L 63/102* (2013.01); *H04L 63/20* (2013.01)

(58) Field of Classification Search
CPC ............. H04L 63/0876; H04L 63/0435; H04L 63/102; H04L 63/20; H04L 63/10; H04L 63/08
See application file for complete search history.

(56) References Cited

U.S. PATENT DOCUMENTS 6,988,133 B1  1/2006  Zavalkovsky et al.
7,444,666 B2  10/2008  Edwards et al.
(Continued)

FOREIGN PATENT DOCUMENTS

CN  101562621 B  5/2013
CN  112035858 A  12/2020

OTHER PUBLICATIONS

Teger et al.; "Oracle Fusion Middleware Administrator's Guide for Oracle Entitlements Server 11g Release 1 (11.1.1)"; Oracle Help Center; pp. 1-28; Jan. 2012; 'https://docs.oracle.com/cd/E29542_01/admin.1111/e14096/toc.htm; Retrieved from the Internet on Aug. 13, 2021.
(Continued)

*Primary Examiner* — Yogesh Paliwal
(74) *Attorney, Agent, or Firm* — CPST Intellectual Property Inc.; Brett J. Slaney

(57) ABSTRACT

A system and method are provided for authenticating client devices communicating with an enterprise system. The method includes providing a policy enforcement interceptor to intercept API calls and enabling the policy enforcement interceptor to communicate with a policy information point to query the at least one endpoint for entitlements associated with an account. The method also includes intercepting an API call to the application API, communicating with the policy information point to determine entitlements associated with the account by having the policy information point query an entitlements database and, when the entitlements returned to the policy enforcement interceptor are valid, invoking a policy decision point to validate the client device. The method also includes, when the client device is validated, permitting invocation of the API. The method also includes providing an API response to the client device to permit access to the application via the API.

20 Claims, 11 Drawing Sheets

(56) References Cited

U.S. PATENT DOCUMENTS

| | | | |
|---|---|---|---|
| 7,716,240 B2 | 5/2010 | Lim | |
| 8,763,088 B2 | 6/2014 | Chua et al. | |
| 9,430,302 B2 | 8/2016 | Zhao et al. | |
| 9,450,963 B2 | 9/2016 | Srinivasan et al. | |
| 9,491,201 B2 | 11/2016 | Bagepalli et al. | |
| 9,503,478 B2 | 11/2016 | Chernoguzov et al. | |
| 9,571,495 B2 | 2/2017 | Amiri | |
| 9,635,029 B2 | 4/2017 | Staggs et al. | |
| 9,881,304 B2 | 1/2018 | Morrison et al. | |
| 9,973,472 B2 | 5/2018 | Woolward et al. | |
| 10,057,364 B2 | 8/2018 | Chen et al. | |
| 10,469,314 B2 | 11/2019 | Ennis, Jr. et al. | |
| 10,990,702 B1 | 4/2021 | Hinrichs et al. | |
| 2007/0094503 A1* | 4/2007 | Ramakrishna | H04L 63/062 713/172 |
| 2008/0060051 A1* | 3/2008 | Lim | G06F 11/3006 726/1 |
| 2011/0289134 A1* | 11/2011 | de los Reyes | H04L 67/01 726/1 |
| 2015/0213449 A1* | 7/2015 | Morrison | G06Q 20/4016 705/44 |
| 2020/0244700 A1* | 7/2020 | Moon | G06F 40/35 |

OTHER PUBLICATIONS

KeyCloak; "Authorization Services Guide"; KeyCloak Website; Mar. 2021; keycloak.org/docs/latest/authorization_services/; Retrieved from the Internet on Aug. 13, 2021.

* cited by examiner

SYSTEM AND METHOD FOR AUTHENTICATING CLIENT DEVICES COMMUNICATING WITH AN ENTERPRISE SYSTEM

CROSS-REFERENCE TO RELATED APPLICATION(S)

This application is a Continuation of U.S. patent application Ser. No. 17/401,602 filed on Aug. 13, 2021, the contents of which are incorporated herein by reference in their entirety.

TECHNICAL FIELD

The following relates generally to authenticating client devices communicating with an enterprise system.

BACKGROUND

Business banking serves an important type of financial services client, namely clients that require financial services in running and operating a business. However, it is found that current digital servicing platforms have aged and may not support both the current needs as well as the aspirations of the business. For example, neither customers nor employees may have the right tools in the digital environment, resulting in needing to work within the constraints of the current system rather than the system supporting the business needs.

Moreover, customers are often required to work in multiple systems with varying degrees of integration. For example, a business client such as an accountant that does work for multiple clients would often need to have different credentials to interact with the platform on behalf of each client. Such systems are expected to not support the anticipated needs of businesses moving forward.

Updating such platforms with current digital experience expectations requires servicing capabilities across payments, management of products and services, management of users and their entitlements, reporting, notifications/messaging, document management, and content management. This can require a significant update for a financial institution (or other enterprise having similar needs) and can impact the workforce that supports the servicing platform.

BRIEF DESCRIPTION OF THE DRAWINGS

Embodiments will now be described with reference to the appended drawings wherein.

DETAILED DESCRIPTION

Figure 1:
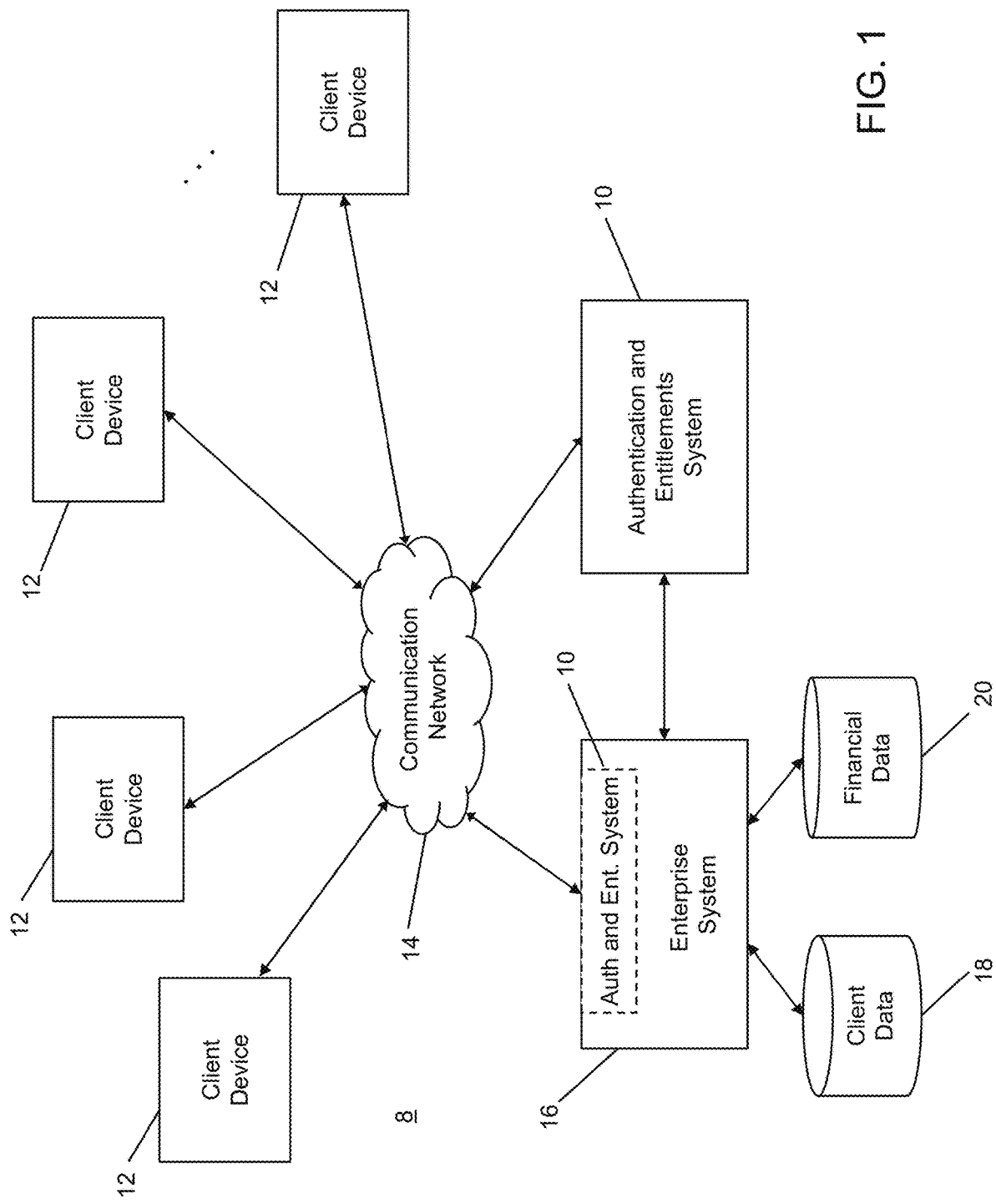
FIG. 1 is a schematic diagram of an example computing environment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

A digital platform for enterprise systems such as banking is described. The platform can allow customers to have a consolidated portfolio view of their balances (and accounts they service) and to be able to act as the client on the account of their choice (when permitted), and to view an execute transactions. Historically, trust was placed at the front-end user interfaces to validate authorizations in such business banking platforms. However, this can lead to a security vulnerability to online systems. A security architecture and data model are provided that can be used in such a business banking (or similar) platform. The security architecture introduces a set of application programming interface (API) policies to provide secure enterprise authentication, including one-time authentications within the system while maintaining and acting on the currency of credentials. The API policies along with a backend system architecture removes the job of authentication and authorization validation from typical front-end components such as user interfaces. By deploying the API policies via a software development kit (SDK) and by using encryption (e.g., OAuth tokens using TLS encryption for communications), user identity and entitlements can be made immutable objects to ensure that malicious online users cannot change which accounts they can interact with, since tampering with transactions can be detected and the API framework can decline the payload request from the user interface in the front-end.

Platform API policies can be utilized by different business platform user APIs. Described below is a set of tools and capabilities to enable APIs to control and evaluate who can access and modify the different platform resources (authentication and authorization). Different levels of evaluations can be processed and executed based on an authentication and entitlements infrastructure.

The API policies can include the following components:
  PIP: The PIP refers to the "policy information point" which provides a set of data points for the other components within the policy ecosystem. That is, the PIP makes real-time calls to determine if the business user has the credential at the moment the request is made by communicating with the backend components.

PEP: The PEP refers to a "policy enforcement point", which orchestrates the calls to the PIP components and ensures the PDP processing units (see below) are executed for all the different API invocations. That is, the PEP examines the credentials (e.g., OAUTH token) and checks for tampering or any issues with the credentials.

PDP: The PDP refers to the "policy decision point", which is the processing unit of the security evaluation where it will ensure the active system user is allowed to operate against the requested uniform resource indicator (URI) and requested payload. The PDP checks to see if the user is allowed to access the requested API operation and has the authority to operate against the requested payload elements like accounts, organization units, users, etc. That is, the PDP provides the business logic to determine entitlements, services, actions and makes the decision if the user is allowed to do the requested action.

It will be appreciated that while examples provided herein are directed to banking and financial-related enterprise systems, the principles discussed herein equally apply to any digital platform that requires authentication and entitlement functionality for one or more services or applications within the enterprise.

Certain example systems and methods described herein are able to authenticate client devices, such as those communicating with applications in an enterprise system. In one aspect, there is provided a server device for authenticating client devices communicating with an enterprise system. The server device includes a processor, a communications module coupled to the processor, and a memory coupled to the processor. The memory stores computer executable instructions that when executed by the processor cause the processor to provide a policy enforcement interceptor to intercept API calls to an API used to access an application by a client device. The memory also stores computer executable instructions that when executed by the processor cause the processor to enable the policy enforcement interceptor to communicate with a policy information point connected to at least one endpoint in the enterprise system to query the at least one endpoint for entitlements associated with an account. The memory also stores computer executable instructions that when executed by the processor cause the processor to intercept, by the policy enforcement interceptor, an API call to the application API; and communicate with the policy information point to determine entitlements associated with the account by having the policy information point query an entitlements database in the enterprise system. The memory also stores computer executable instructions that when executed by the processor cause the processor to, when the entitlements returned to the policy enforcement interceptor are valid, invoke a policy decision point to validate the client device. The memory also stores computer executable instructions that when executed by the processor cause the processor to, when the client device is validated, permit invocation of the API. The memory also stores computer executable instructions that when executed by the processor cause the processor to provide an API response to the client device to permit access to the application via the API.

In another aspect, there is provided a method of authenticating client devices communicating with an enterprise system. The method is executed by a server device and includes providing a policy enforcement interceptor to intercept API calls to an API used to access an application by a client device. The method also includes enabling the policy enforcement interceptor to communicate with a policy information point connected to at least one endpoint in the enterprise system to query the at least one endpoint for entitlements associated with an account. The method also includes intercepting, by the policy enforcement interceptor, an API call to the application API; and communicating with the policy information point to determine entitlements associated with the account by having the policy information point query an entitlements database in the enterprise system. The method also includes, when the entitlements returned to the policy enforcement interceptor are valid, invoking a policy decision point to validate the client device. The method also includes, when the client device is validated, permitting invocation of the API. The method also includes providing an API response to the client device to permit access to the application via the API.

In another aspect, there is provided a non-transitory computer readable medium for authenticating client devices communicating with an enterprise system. The computer readable medium includes computer executable instructions for providing a policy enforcement interceptor to intercept API calls to an API used to access an application by a client device. The computer readable medium also includes computer executable instructions for enabling the policy enforcement interceptor to communicate with a policy information point connected to at least one endpoint in the enterprise system to query the at least one endpoint for entitlements associated with an account. The computer readable medium also includes computer executable instructions for intercepting, by the policy enforcement interceptor, an API call to the application API; and communicating with the policy information point to determine entitlements associated with the account by having the policy information point query an entitlements database in the enterprise system. The computer readable medium also includes computer executable instructions for, when the entitlements returned to the policy enforcement interceptor are valid, invoking a policy decision point to validate the client device. The computer readable medium also includes computer executable instructions for, when the client device is validated, permitting invocation of the API. The computer readable medium also includes computer executable instructions for providing an API response to the client device to permit access to the application via the API.

In certain example embodiments, the policy enforcement interceptor, the policy information point, and the policy decision point can each be provided as modules in a plurality of APIs used to access corresponding ones of a plurality of applications accessible to the client device.

In certain example embodiments, the policy information point can be provided as a separate service from the API used to access the application. The policy information point can be configured to serve a plurality of APIs used to access corresponding ones of a plurality of applications accessible to the client device.

In certain example embodiments, the policy information point can be deployed using a software development kit (SDK).

In certain example embodiments, communications to and from the policy enforcement interceptor, the policy information point, and the policy decision point are secured by an encrypted communications channel and authorization security token.

In certain example embodiments, the server device can be configured to update the entitlements database.

In certain example embodiments, the policy enforcement interceptor can communicate with an API controller for the application to obtain the appropriate API response based on the API call.

In certain example embodiments, the policy information point can utilize a data model that is populated using a set of different views, the set of different views structured to include data elements according to a policy evaluation required.

In certain example embodiments, the entitlements database can include entitlements for the client device that correspond to a plurality of organizational units.

FIG. 1 illustrates an exemplary computing environment 8. In one aspect, the computing environment 8 may include one or more client devices 12, and a communications network 14 connecting one or more components of the computing environment 8.

The computing environment 8 may also include an enterprise system 16 (e.g., a financial institution such as commercial bank and/or insurance provider) that provides financial services accounts to users and processes financial transactions associated with those financial service accounts. The enterprise system 16 in this example either includes (as shown as optional using dashed lines) or is coupled to an operates with an authentication and entitlements system 10. While several details of the enterprise system 16 and authentication and entitlements system 10 have been omitted for clarity of illustration, reference will be made to FIGS. 8 and 9 below for additional details.

The enterprise system 16 includes or otherwise has access to a datastore for storing client data 18 and a datastore for storing financial data 20. The authentication and entitlements system 10 may have has access to the client data 18 via the enterprise system 16. The authentication and entitlements system 10 may also have access to the financial data 20 via the enterprise system 16 or by direct access. The client data 18 may include both data associated with a user of a client device 12 that interacts with the enterprise system 16 (e.g., via the authentication and entitlements system 10 for participating in business banking) and transaction history data that is captured and provided with a transaction entry, e.g., in the graphical user interface of a mobile or web-based banking application. The data associated with a user can include client profile data that may be mapped to corresponding financial data 20 for that user. It can be appreciated that the financial data 20 could also include transaction data and/or the client data 18 shown in FIG. 1 and these datastores are shown separately for illustrative purposes. The client data 18 can include both data that is associated with a client as well as data that is associated with one or more user accounts for that client as recognized by the computing environment 8.

The data associated with a client may include, without limitation, demographic data (e.g., age, gender, income, location, etc.), preference data input by the client, and inferred data generated through machine learning, modeling, pattern matching, or other automated techniques. The client data 18 or workflow data 20 may also include historical interactions and transactions associated with the transactional workflow system 10 and/or enterprise system 16, e.g., login history, search history, communication logs, documents, etc.

It can be appreciated that while the authentication and entitlements system 10 and enterprise system 16 are shown as separate entities in FIG. 1, they may also be part of the same system. For example, the authentication and entitlements system 10 can be hosted and provided within the enterprise system 16 as illustrated in dashed lines in FIG. 1 and illustratively in FIG. 9.

Client devices 12 may be associated with one or more users. Users may be referred to herein as customers, clients, policy holders, correspondents, or other entities that interact with the enterprise system 16 and/or authentication and entitlements system 10 (directly or indirectly). The computing environment 8 may include multiple client devices 12, each client device 12 being associated with a separate user or associated with one or more users. In certain embodiments, a user may operate client device 12 such that client device 12 performs one or more processes consistent with the disclosed embodiments. For example, the user may use client device 12 to engage and interface with a business banking application which uses or incorporates the authentication and entitlements system 10 to perform authentication and authorization operations to enable the user to access the appropriate accounts, data, etc.

In certain aspects, client device 12 can include, but is not limited to, a personal computer, a laptop computer, a tablet computer, a notebook computer, a hand-held computer, a personal digital assistant, a portable navigation device, a mobile phone, a wearable device, a gaming device, an embedded device, a smart phone, a virtual reality device, an augmented reality device, third party portals, an automated teller machine (ATM), and any additional or alternate computing device, and may be operable to transmit and receive data across communication network 14.

Communication network 14 may include a telephone network, cellular, and/or data communication network to connect different types of client devices 12. For example, the communication network 14 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In one embodiment, authentication and entitlements system 10 may be implemented using one or more computer systems (e.g., server devices) configured to process and store information and execute software instructions to perform one or more processes consistent with the disclosed embodiments. In certain embodiments, although not required, authentication and entitlements system 10 may be associated with one or more business entities. In certain embodiments authentication and entitlements system 10 may represent or be part of any type of business entity. For example, authentication and entitlements system 10 may be a system associated with a commercial bank and/or insurance company (e.g., enterprise system 16), a digital media service provider, or some other type of business having users that can be authenticated and authorized to access and interact with multiple accounts within the enterprise 16 (e.g., government tax authority, digital services, etc.). The authentication and entitlements system 10 can also operate as a standalone entity that is configured to serve multiple business entities, e.g., to act as an agent therefor.

Referring back to FIG. 1, the authentication and entitlements system 10 and/or enterprise system 16 may also include a cryptographic server (not shown) for performing cryptographic operations and providing cryptographic services (e.g., authentication (via digital signatures), data protection (via encryption), etc.) to provide a secure interaction channel and interaction session, etc. Such a cryptographic server can also be configured to communicate and operate with a cryptographic infrastructure, such as a public key infrastructure (PKI), certificate authority (CA), certificate revocation service, signing authority, key server, etc. The cryptographic server and cryptographic infrastructure can be used to protect the various data communications described herein, to secure communication channels therefor, authenticate parties, manage digital certificates for such parties, manage keys (e.g., public and private keys in a PKI), and perform other cryptographic operations that are required or desired for particular applications of the authentication and entitlements system 10 and enterprise system 16 (e.g., OAuth token generation and use, TLS encryption for communications, etc.). The cryptographic server may be used to protect the financial data 20 and/or client data 18 by way of encryption for data protection, digital signatures or message digests for data integrity, and by using digital certificates to authenticate the identity of the users and client devices 12 with which the enterprise system 16 and/or authentication and entitlements system 10 communicates to inhibit data breaches by adversaries. It can be appreciated that various cryptographic mechanisms and protocols can be chosen and implemented to suit the constraints and requirements of the particular deployment of the authentication and entitlements system 10 or enterprise system 16 as is known in the art.

Figure 2:
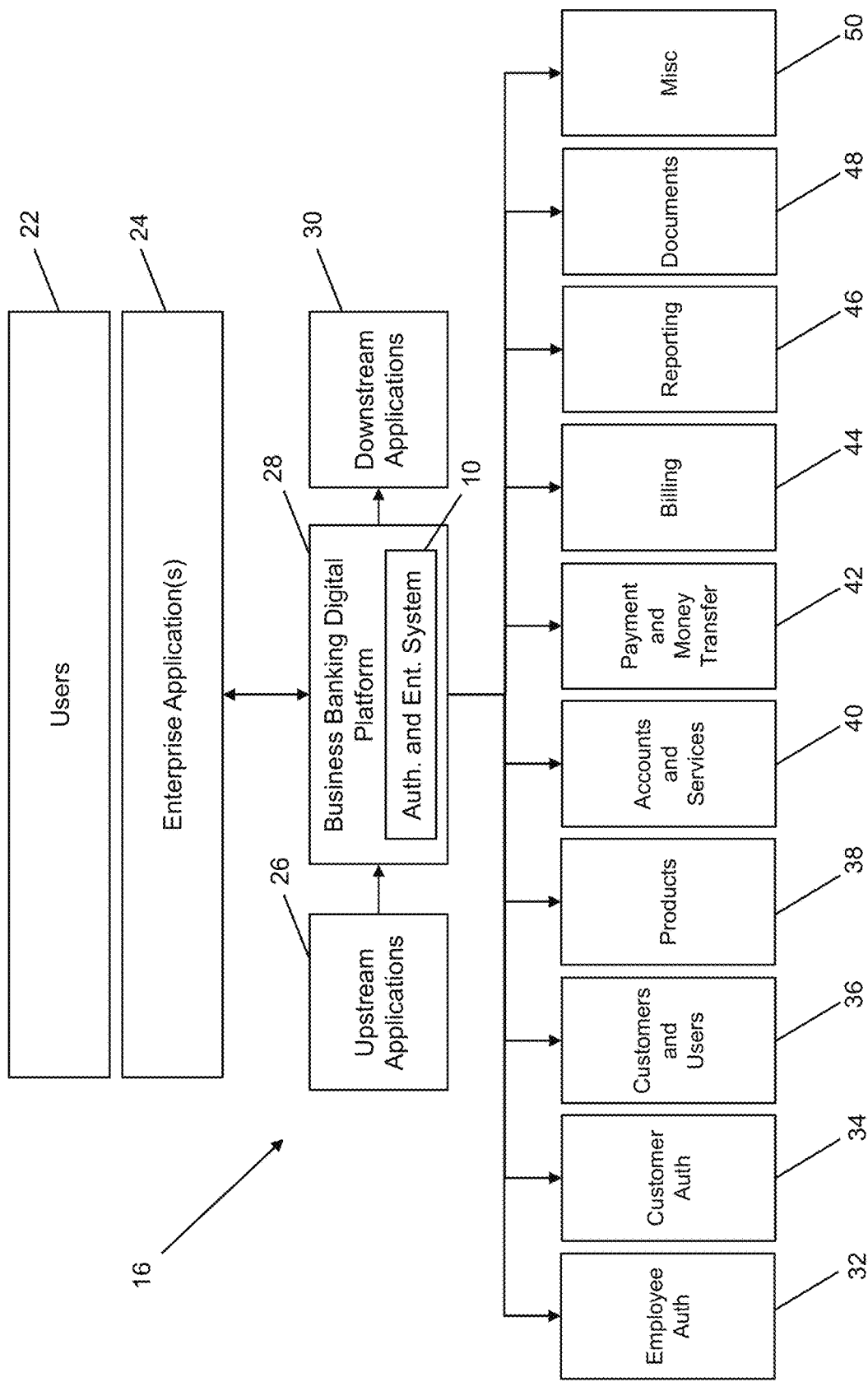
FIG. 2 is a schematic diagram of a business banking digital platform using authentication and entitlements system.

FIG. 2 provides a schematic illustration of an implementation of the enterprise system 16 which includes or otherwise provides a business banking digital platform 28 that utilizes the authentication and entitlements system 10. In this implementation, various users 22 can access the digital platform 28 via one or more enterprise applications 24, such as a business banking application provided by the enterprise system 16 to business banking customers. The digital platform 28 provides a node acting between upstream applications 26 (such as business banking components) and downstream applications 30 (such as for dispute and case management) in the enterprise environment. As shown in FIG. 2, the digital platform 28 can use the authentication and entitlements system 10 to determine authentications and authorizations associated with the users 22 that avoids the need to rely on such authentications and authorizations in the enterprise application UIs. In this example, the users 22 can use the digital platform 28 or the digital platform 28 can use the authentication and entitlements system 10 to perform employee authentication 32, customer authentication 34, access or interact with customers and users 36, access products 38, access accounts and services 40, perform payment and money transfers 42, perform billing 44, perform reporting 46, access documents 48, as well any other miscellaneous elements 50, such as a customer mailbox, messaging, anti-money laundering, etc.

Figure 3:
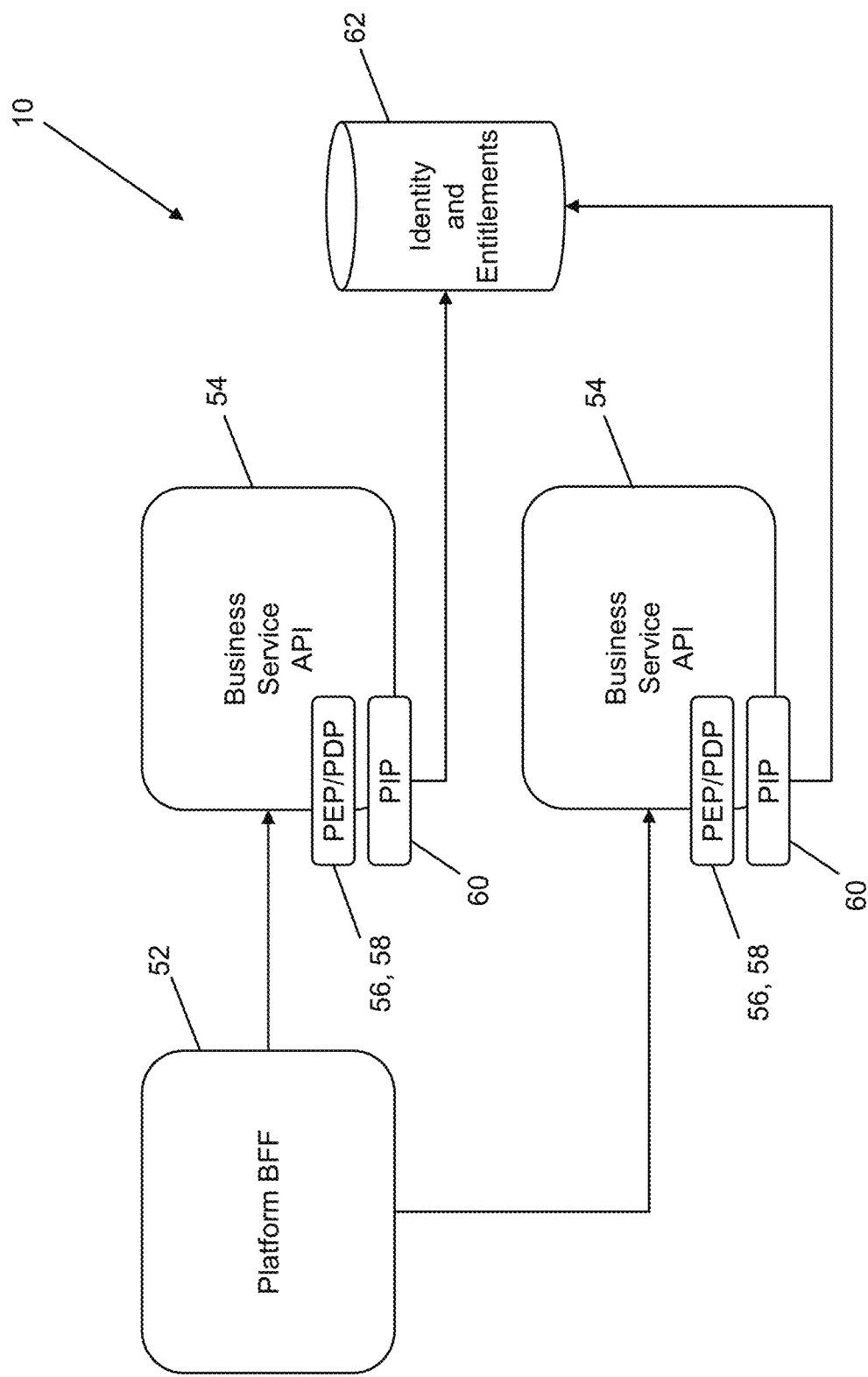
FIG. 3 is a schematic diagram of configuration for implementing the authentication and entitlements system.

Referring now to FIG. 3, an example of a configuration for the authentication and entitlements system 10 is shown. As discussed above, the system 10 provides a way to integrate within a security architecture and data model that can be used in such business banking (or similar) digital platforms 28. The security architecture introduces API policies to provide secure enterprise authentication, including one-time authentications within the system while maintaining and acting on the currency of credentials. The API policies along with a backend system architecture removes the job of authentication and authorization validation from typical front-end components such as user interfaces of, for example, the enterprise applications 24 shown in FIG. 2. By deploying the API policies via an SDK and by using encryption (e.g., OAuth tokens using TLS encryption for communications via the above-noted cryptographic architecture), user identity and entitlements can be made immutable objects to ensure that malicious online users cannot change which accounts they can interact with, since tampering with transactions can be detected and the API framework can decline the payload request from the user interface in the front-end.

To implement these platform API policies a platform back-end for front-end pattern (BFF), referred to herein as the platform BFF 52. The platform BFF can be used to access various business service APIs 54, each being associated with a product, service, feature, application or other element within the enterprise system 16. It can be appreciated that any of the APIs 54 can be an access API that is used to connect to an existing API (not shown) within the enterprise system 16 in a proxy manner. Each business service API 54 includes or otherwise has access to a policy enforcement point (PEP) 56, a policy decision point (PDP) 58, and a policy information point (PIP) 60. The PIP 60 is coupled to an identity and entitlements database 62 that, when deployed within an encryption solution can provide immutable objects that allow the authentication and entitlements system 10 to move authentications and authorizations away from the front-end UIs and into a secure back-end environment.

The PIP 60 provides a set of data points for the other components within the policy ecosystem. That is, the PIP 60 makes real-time calls to the identity and entitlements database 62 to determine if the business user has the credential at the moment the request is made by communicating with the backend components.

The PEP 56 orchestrates the calls to the PIP 60 components and ensures the PDP 58 processing units are executed for all the different API 54 invocations. That is, the PEP 56 examines the credentials (e.g., OAUTH token) and checks for tampering or any issues with the credentials.

The PDP 58 refers to the processing unit of the security evaluation to ensure the active system user is allowed to operate against the requested uniform resource indicator (URI) and requested payload. The PDP 58 checks to see if the user is allowed to access the requested API operation and has the authority to operate against the requested payload elements like accounts, organization units, users, etc. That is, the PDP 58 provides the business logic to determine entitlements, services, actions, and makes the decision if the user is allowed to perform the requested action. For example, a business banking user 22 can access the digital platform 28 to check a balance or make a payment on behalf of a client or department within an organization and the authentication and entitlements system 10 can used the API policy framework to determine entitlements via the back-end systems, including the identity and entitlements database 62 to avoid any vulnerabilities with the security of the front-end UI, such as that provided by the enterprise applications 24 or other applications or portals into the enterprise system 16.

Figure 4:
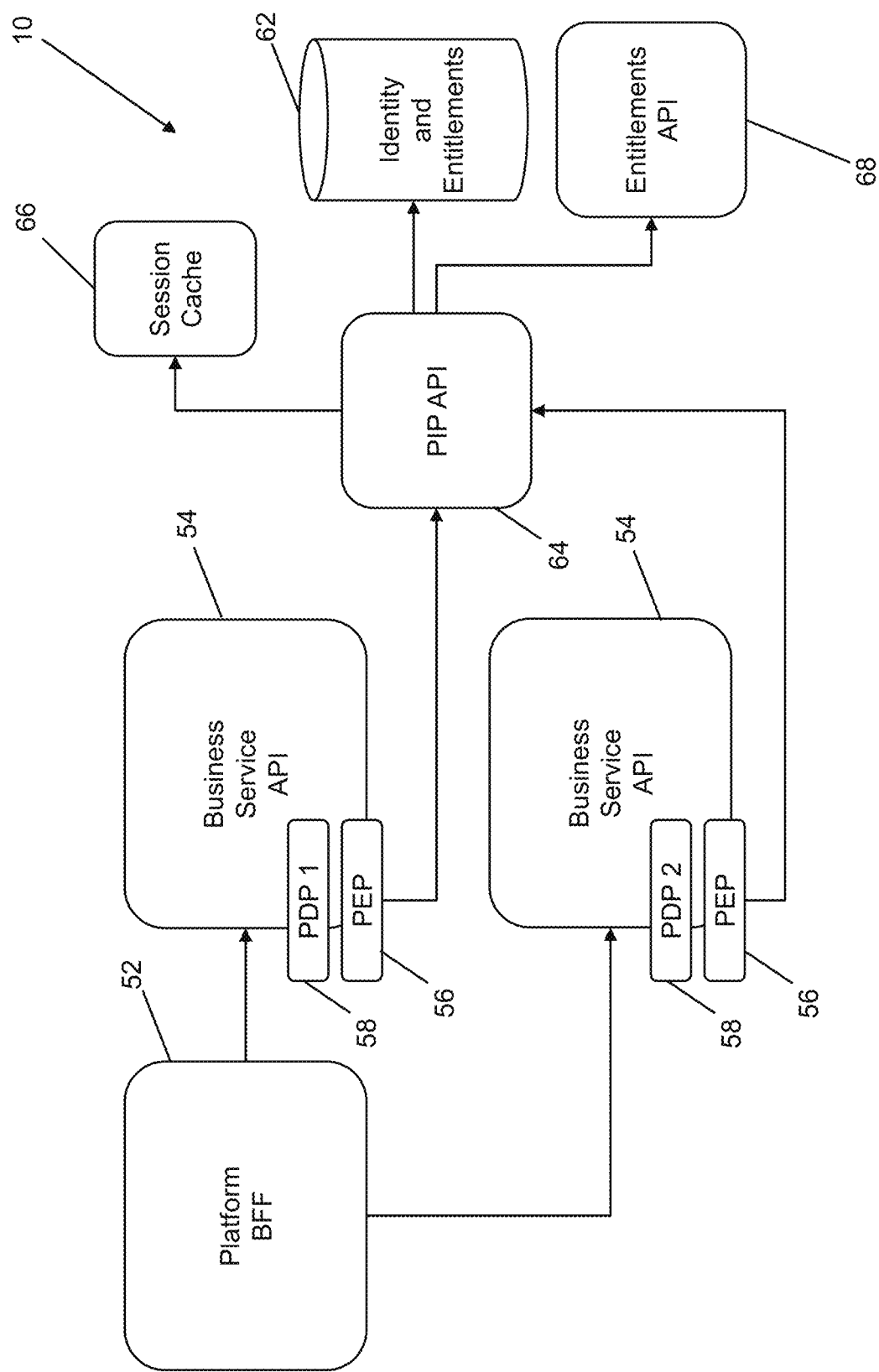
FIG. 4 is a schematic diagram of another configuration for implementing the authentication and entitlements system.

The API policy framework shown in FIGS. 3 (and FIG. 4 described below) can be deployed using an SDK or other library to make it deployable in any suitable digital platform 28 or related environment. For example, as shown in FIG. 3, an SDK can be used to insert the PEP 56, PDP 58, and PIP 60 components within each business service API 54 to authenticate/validate the different API invocations. FIG. 4 illustrates another configuration in which a separate PIP API 64 is used by the business services APIs 54 to access the identity and entitlements database 62 and/or an entitlements API 68. This configuration can utilize a session cache 66 for the PIP API 64 to enable multiple parallel API invocations to be serviced by the single PIP API 64.

Figure 5:
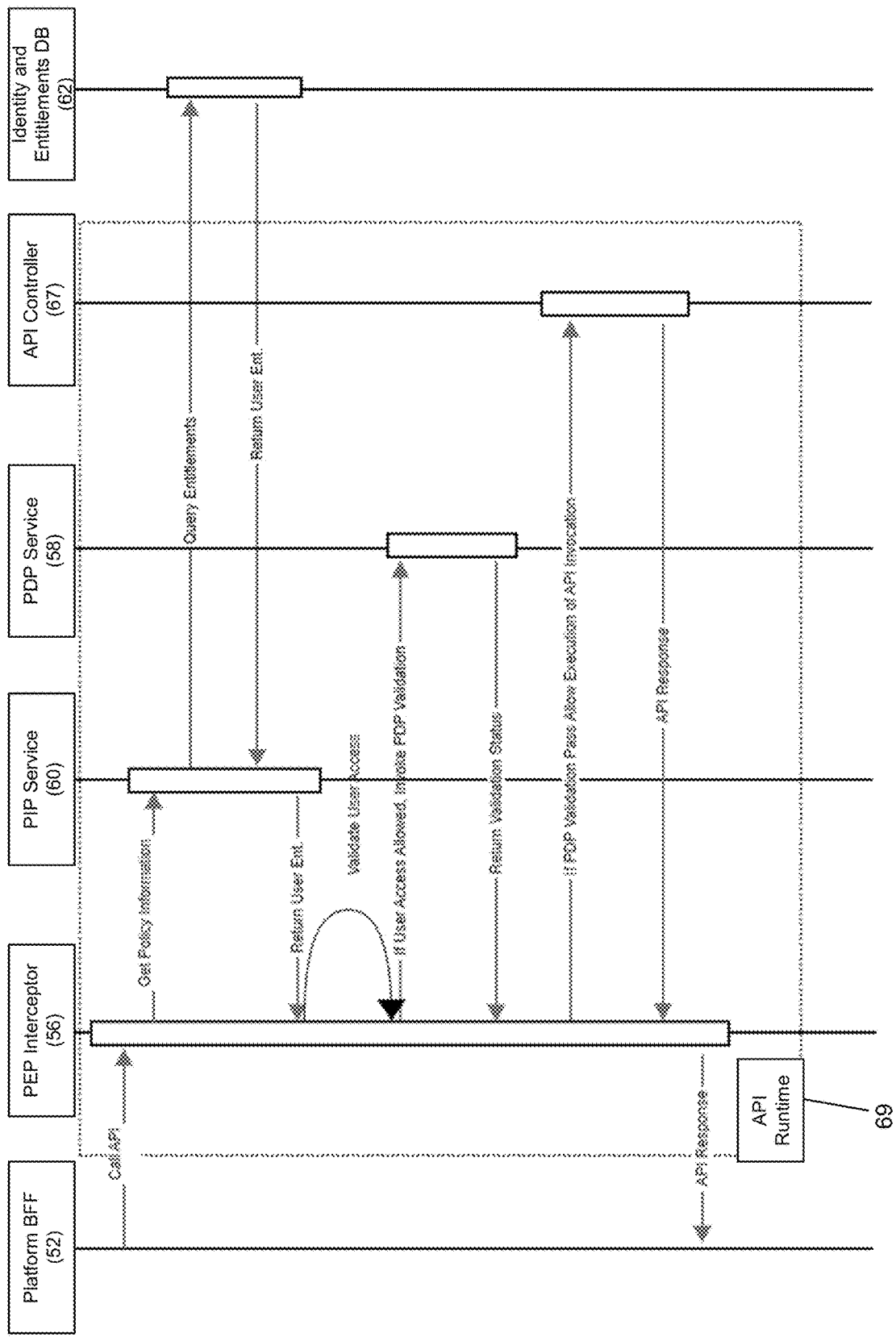
FIG. 5 is a sequence diagram illustrating operation of the authentication and entitlements system.

Referring now to FIG. 5, a sequence diagram is shown illustrating operations performed by the authentication and entitlements system 10 using the API policies and components illustrated in FIGS. 3 and 4. The platform BFF 52 makes an API call that is intercepted by the PEP 56. The PEP 56 issues a Get Policy Information request to the PIP 60 service, which then issues a Query Entitlements request to the identity and entitlements database 62. The database 62 returns the entitlements for the particular user 22 to the PIP 60, which redirects these entitlements back to the PEP 56 that intercepted the API call. The PEP 56 validates the user's access based on the returned entitlements. If the user is allowed access, the PEP 56 invokes a PDP validation by communicating with the PDP 58 service. As noted above, the PDP 58 checks to see if the user is allowed to access the requested API operation and has the authority to operate against the requested payload elements like accounts, organization units, users, etc. The PDP 58 returns the validation status to the PEP 56. If the PDP validation passes, the PEP 56 communicates with an API controller 67 to allow the execution of the API invocation. The API controller 67 then returns the appropriate API response to the PEP 56. The PEP 56 then permits the API response to be returned to the front-end UI via the platform BFF 52. The sequence shown in FIG. 5 can be implemented as an API runtime routine 69 to handle API calls from the platform BFF 52 in order to move authentications and authorizations to the back-end, rather than leave such authentications and authorizations in the control and responsibility of the front-end UIs.

Figure 6:
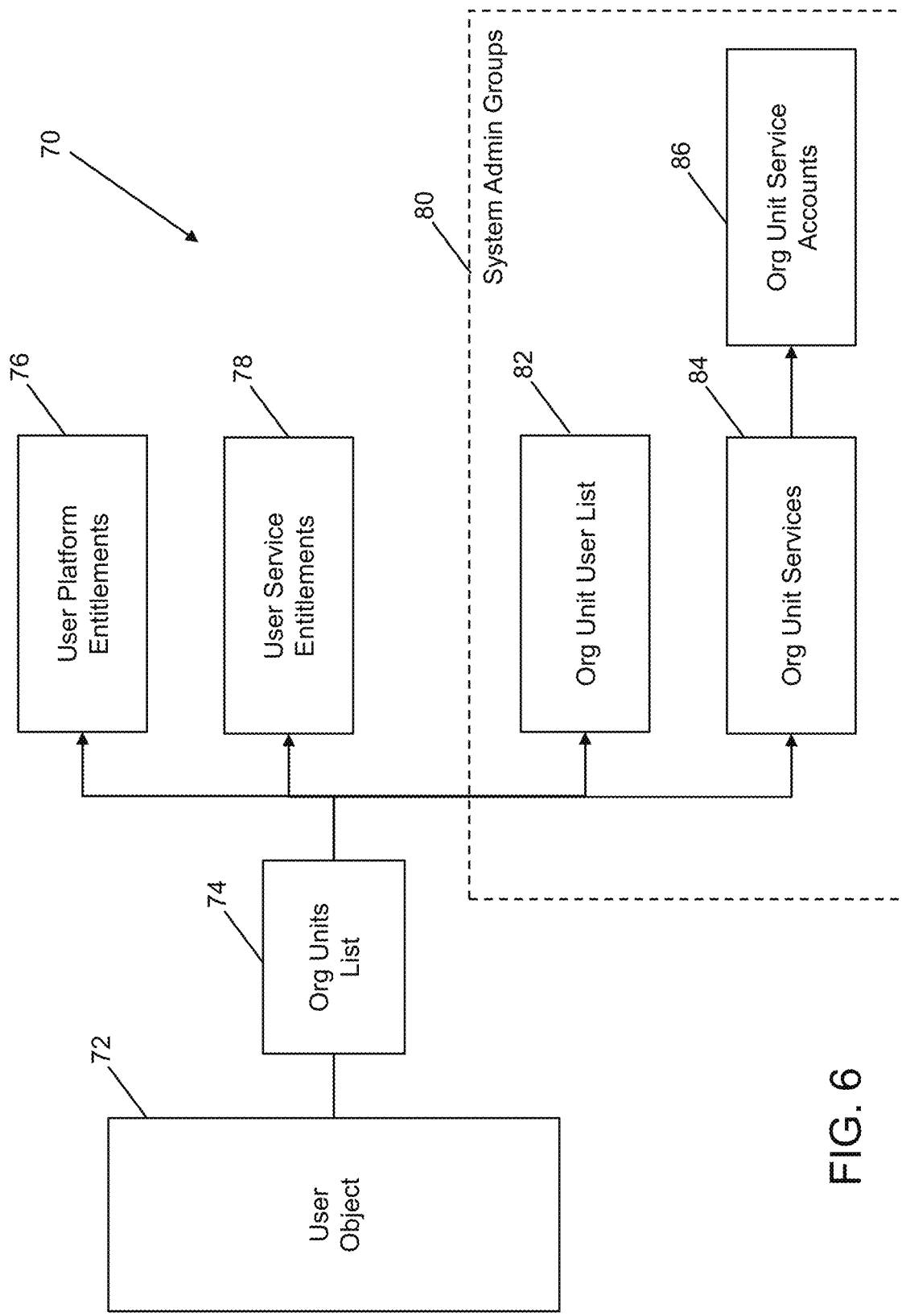
FIG. 6 is schematic diagram depicting a data model for reflecting hierarchies in an enterprise or organization utilizing the authentication and entitlements system.

The identity and entitlements database 62 can include or reference a data model 70 for user entitlements as shown in FIG. 6, which enables the authentication and entitlements system 10 adopt a structured hierarchy to reflect the relationships between the different data layer entities. This allows the system 10 to begin with the active user as the main user object 72, which will encapsulate the different data elements related to this user (e.g., org unit relations, platform entitlements, service entitlements, etc.). As shown in FIG. 6, the user object 72 can branch out into the tree representation to an org units list 74. The org units list 74 branches into user platform entitlements 76, user service entitlements 78, and system admin groups 80. In this example, the system admin groups 80 include an org unit user list 82, org unit services 84, and the org unit services 84 can link to org unit service accounts 86. The data model 70 can be used by the policy structure shown in FIGS. 3 and 4 to determine various identities and entitlements according to a particular organizational hierarchy utilized by the enterprise system 16.

Figure 7:
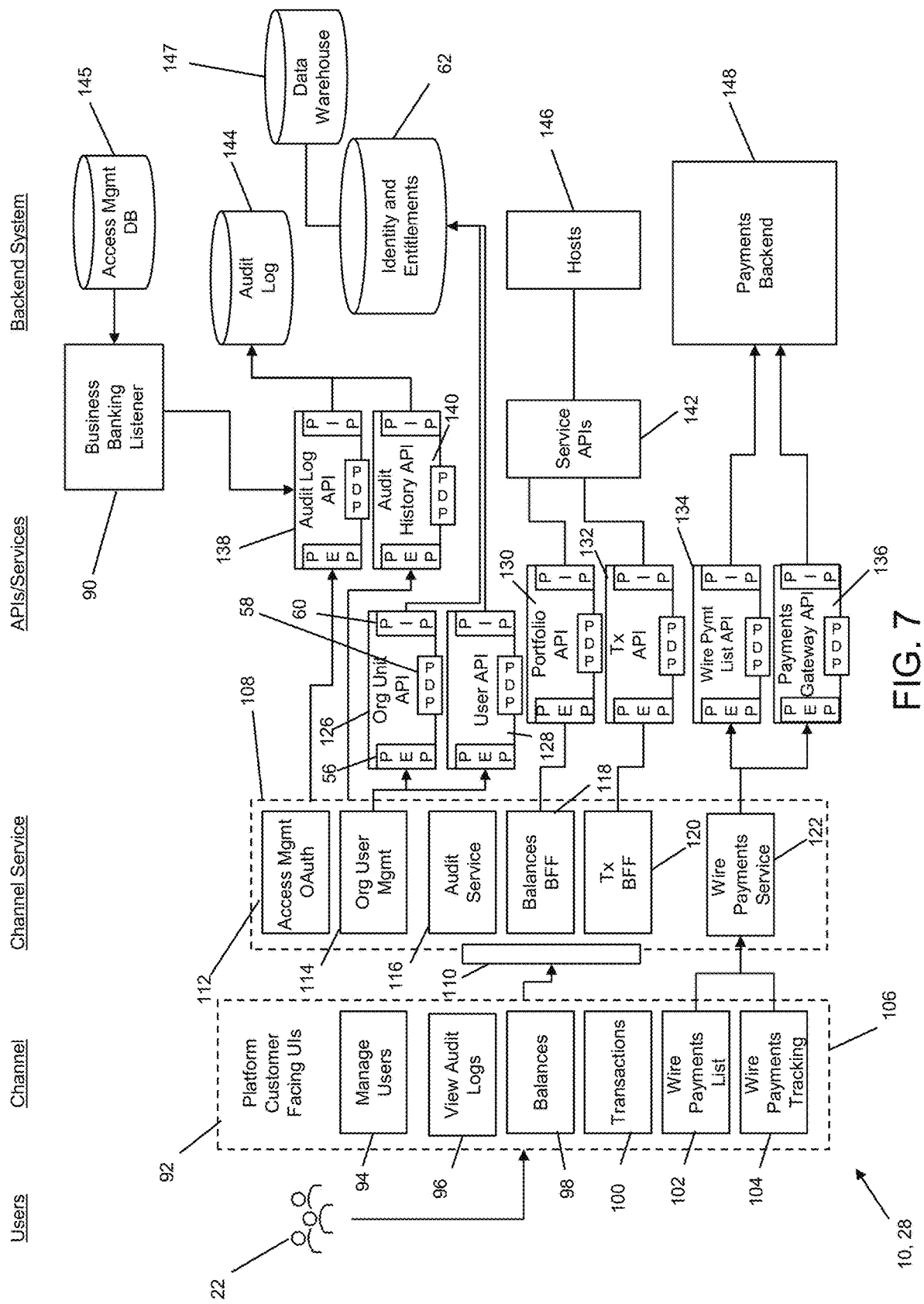
FIG. 7 is a schematic diagram depicting an example of a configuration for the digital platform utilizing the authentication and entitlements system.

FIG. 7 illustrates an example of an implementation of the authentication and entitlements system 10 and digital platform 28 in a business banking context. In this example, users 22 (e.g., business banking customers) can access the digital platform 28 via a number of channels, via platform customer-facing UIs 92. In this example, the channels include a manage users channel 94, a view audit logs channel 96, a balances channel 98, a transactions channel 100, a wire payments list channel 102, and a wire payments tracking channel 104. These customer-facing UIs 92 provide mobile or web-based application features to the users 22 and allow the users 22 to perform various functions. The authentication and entitlements system 10 are built into the digital platform 28 in this configuration to offload the authentication and authorization validations from the front-end UI components. The customer-facing UIs 92 connect into the platform 28 via a gateway 110 to a number of channel services 108.

The channel services 108 includes an access management OAuth service 112. OAuth is an open standard for access delegation, commonly used as a way for internet users to grant websites or applications access to information on other websites without given them passwords. By using OAuth service 112, the digital platform 28 can generate OAuth tokens to secure communications between front-end, mid-tier, and back-end components. The OAuth tokens are encrypted, e.g., via an HTTPS-TLS encrypted channel, to ensure it cannot be tampered with. In this way, even if the front-end components (e.g., customer-facing UIs 92) are compromised, the mid-tier API implementation using the PEP 56, PDP 58, and PIP 60 services would stop the transaction associated with the API invocation from being processed to the backend identity and entitlements database 62 or other systems, such as those shown in FIG. 7. That is, the OAuth/encrypted channel and the PEP-PDP-PIP framework described herein validates and enforces transactions of consequence within the authentication and entitlements system 10 and digital platform 28 and, thus the identities and entitlements can be made immutable as such.

Other example channel services shown in FIG. 7 include an org user management service 114, an audit service 116, a balances BFF 118, a transactions BFF 120, and a wire payments service 122. It can be appreciated that any one or more of the channel services 108 can be associated with the platform BFF 52 shown in FIGS. 3 and 4. The channel services 108 connect to APIs/services to access backend systems. The access management OAuth service 112 is associated with an access management database 145 that is coupled to a business banking listener 90.

The audit service 116 connects to an audit log API 138, which includes the PEP-PDP-PIP 56, 58, 60 components. The audit log API 138 is also coupled to the business banking listener 90 that has access to the access management database 145 for implementing login workflows, which can incorporate OAuth tokens, etc. The audit log API 138 accesses an audit log database 144. The audit service 116 (or channel services 108 more generally) can also connect to an audit history API 140 that is coupled to the audit log database 144 to obtain audit log histories as needed.

The org user management service 114 connects to both an org unit API 126 and a user API 128, each having the PEP-PDP-PIP 56, 58, 60 components. the org unit API 126 and user API 128 utilize the PIP 60 to access identity and entitlements database 62. As shown in FIG. 7, the identity and entitlements database 62 can also be fed or populated by a data warehouse 147 in the backend systems. The balances BFF 118 connects to a portfolio API 130 and the transactions BFF 120 connects to a transactions API 132. The APIs 130, 132 each include the PEP-PDP-PIP 56, 58, 60 components and connect to service APIs 142 (e.g., account API, loans API, credit card API, etc.). The service APIs 142 can also connect into backend hosts 146.

The wire payments service 122 connects into a wire payments list API 134 and a payments gateway API 136. Each of the APIs 134, 136 includes the PEP-PDP-PIP 56, 58, 60 components and connect into payments backend hosts, services, and other architecture components of the backend systems.

The channels 106, channel services 108, APIs/services, and backend systems are illustrative of an example of a digital platform 28, e.g., provided for business banking users 22. It can be appreciated that other channels can be added and with a PEP-PDP-PIP 56, 58, 60 SDK or other library used to extend the security architecture to such other components and channels. In this way, the digital platform 28 is scalable and deployable in any number of configurations while offloading authentications and authorizations from the front-end UI components.

Figure 8:
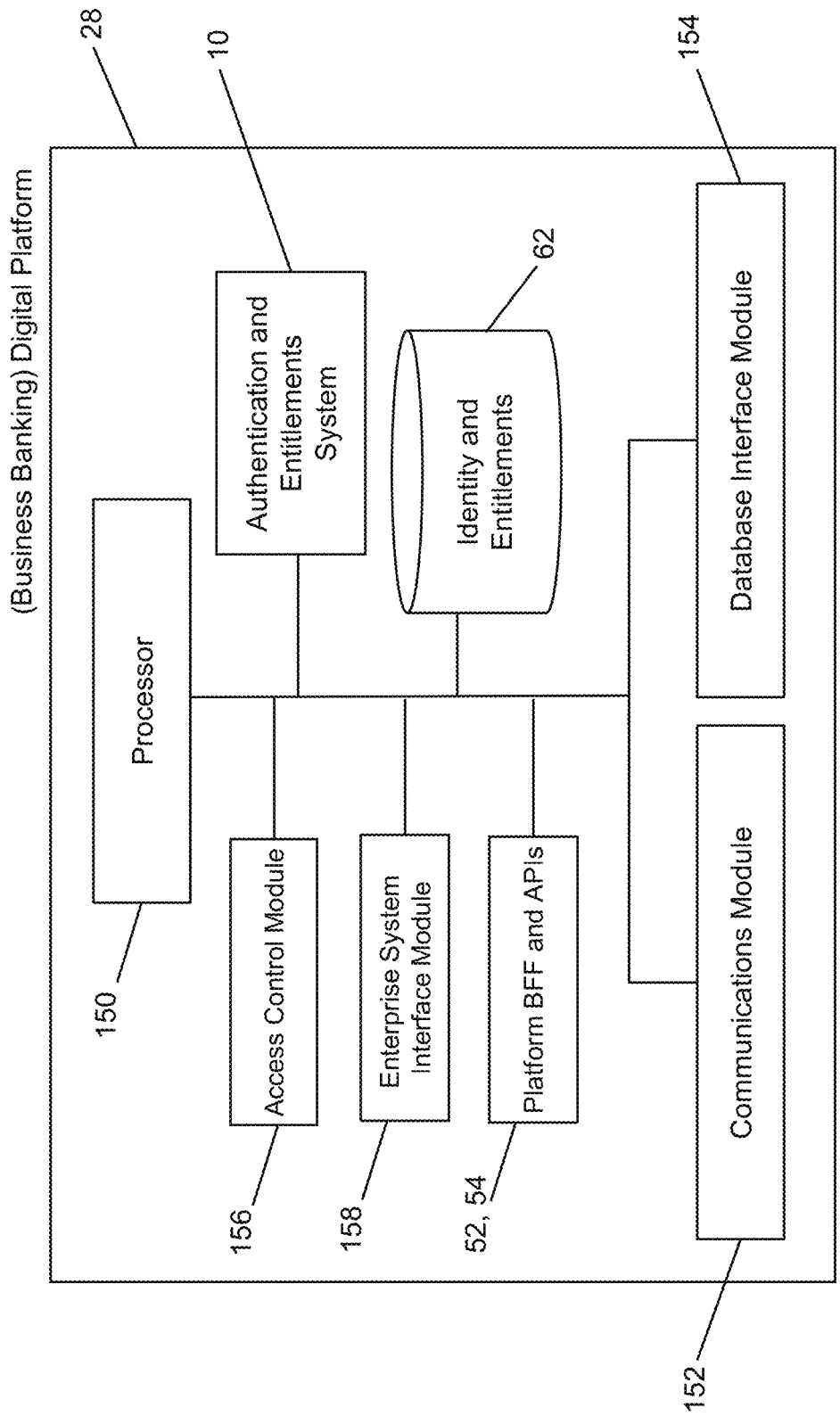
FIG. 8 is a block diagram of an example configuration for the digital platform.

In FIG. 8, an example configuration of the digital platform 28 is shown. In certain embodiments, the digital platform 28 may include one or more processors 150, a communications module 152, and a database interface module 154 for interfacing with the datastore of financial data 20 and client data 18 (if permitted) to retrieve, modify, and store (e.g., add) data. Communications module 152 enables the digital platform 28 to communicate with one or more other components of the computing environment 8, such as client device 12 (or one of its components), via a bus or other communication network, such as the communication network 14. While not delineated in FIG. 8, the digital platform 28 includes at least one memory or memory device that can include a tangible and non-transitory computer-readable medium having stored therein computer programs, sets of instructions, code, or data to be executed by processor 150. FIG. 8 illustrates examples of modules, tools and engines stored in memory on the digital platform 28 and operated or executed by the processor 150. It can be appreciated that any of the modules, tools, and engines shown in FIG. 8 may also be hosted externally and be available to the digital platform 28, e.g., via the communications module 152. In the example embodiment shown in FIG. 8, the digital platform 28 includes an access control module 156, an enterprise system interface module 158, a platform BFF and various APIs 52, 54 as illustrated above, the authentication and entitlements system 10, and the identity and entitlements database 62.

The access control module 156 may be used to apply a hierarchy of permission levels or otherwise apply predetermined criteria to determine what client data 18 or financial data 20 can be shared with which entity in the computing environment 8. For example, the digital platform 28 may have been granted access to certain sensitive client data 18 or financial data 20 for a user, which is associated with a certain client device 12 in the computing environment 8. Similarly, certain client profile data stored in the client data 18 or financial data 20 may include potentially sensitive information such as age, date of birth, or nationality, which may not necessarily be needed by the digital platform 28 to execute certain actions. As such, the access control module 156 can be used to control the sharing of certain client profile data or other transaction data and/or financial data 20 based on a type of client/user, a permission or preference, or any other restriction imposed by the computing environment 8 or application in which the digital platform 28 is used.

Figure 9:
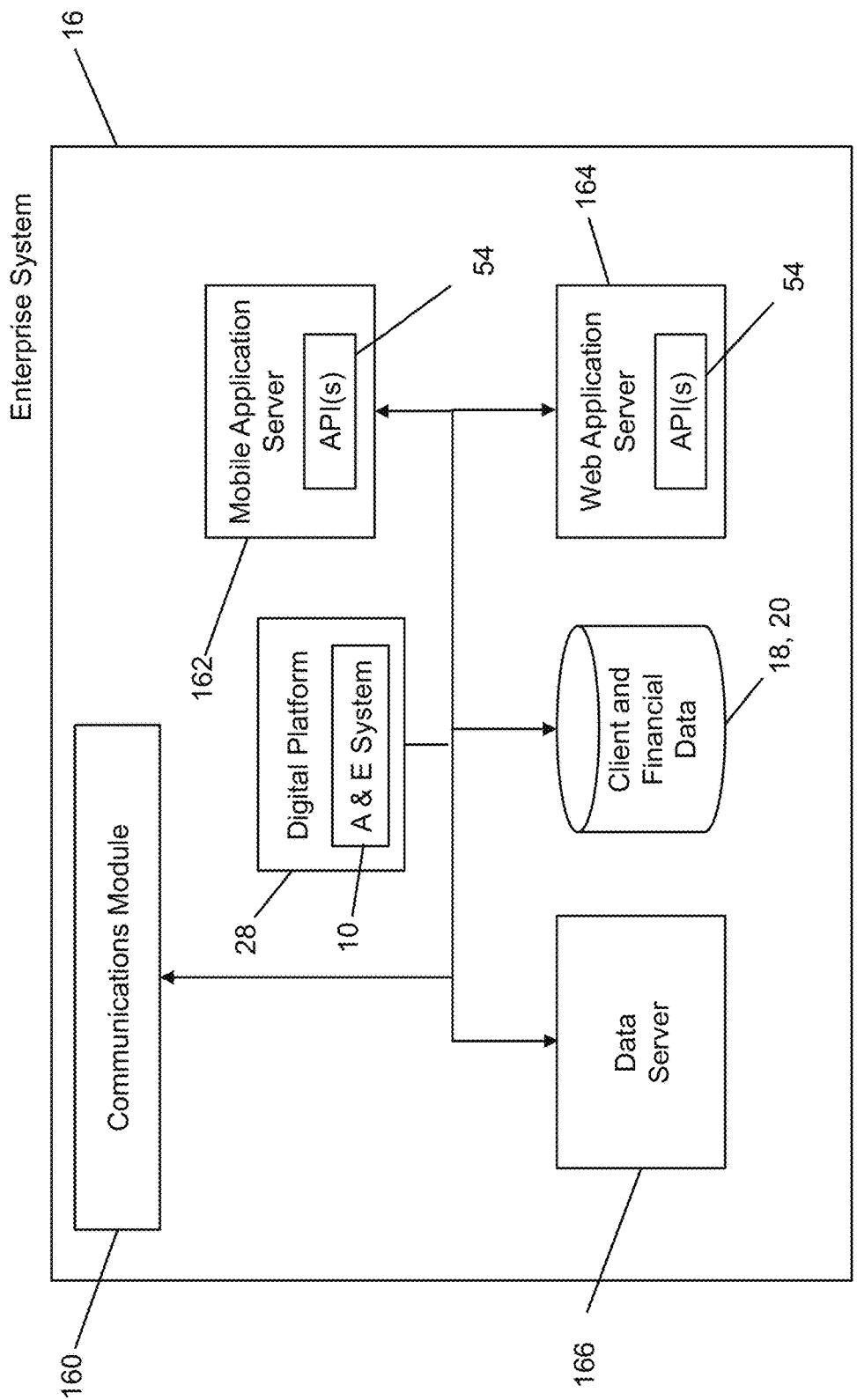
FIG. 9 is a block diagram of an example configuration of an enterprise system.

The enterprise system interface module 158 can provide a graphical user interface (GUI) or API connectivity to communicate with the enterprise system 16 to obtain client data 18 and financial data 20 for a certain user (see FIG. 9). It can be appreciated that the enterprise system interface module 158 may also provide a web browser-based interface, an application or "app" interface, a machine language interface, etc.

In FIG. 9, an example configuration of the enterprise system 16 is shown. The enterprise system 16 includes a communications module 160 that enables the enterprise system 16 to communicate with one or more other components of the computing environment 8, such as client device 12 (or one of its components) or the digital platform 28 (e.g., via authentication and entitlements (A & E) system 10), via a bus or other communication network, such as the communication network 14. While not delineated in FIG. 9, the enterprise system 16 includes at least one memory or memory device that can include a tangible and non-transitory computer-readable medium having stored therein computer programs, sets of instructions, code, or data to be executed by one or more processors (not shown for clarity of illustration). FIG. 9 illustrates examples of servers and datastores/databases operable within the enterprise system 16.

It can be appreciated that any of the components shown in FIG. 9 may also be hosted externally and be available to the enterprise system 16, e.g., via the communications module 160. In the example embodiment shown in FIG. 9, the enterprise system 16 includes one or more servers to provide access to the client data 18 (which may be included with the financial data 20 as shown in FIG. 9) to the digital platform 28, to enable the digital platform 28 to enable business banking users to be authenticated and authorized to perform business banking operations. Exemplary servers include a mobile application server 162, a web server 164 and a data server 166. Although not shown in FIG. 9, as noted above, the enterprise system 16 may also include a cryptographic server for performing cryptographic operations and providing cryptographic services. The cryptographic server can also be configured to communicate and operate with a cryptographic infrastructure. The enterprise system 16 may also include one or more data storages for storing and providing data for use in such services, such as data storage for storing client and financial data 18, 20.

Mobile application server 162 supports interactions with a mobile application installed on client device 12. Mobile application server 162 can access other resources of the enterprise system 16 to carry out requests made by, and to provide content and data to, a mobile application on client device 12. In certain example embodiments, mobile application server 162 supports a mobile banking application such as for mobile business banking. As shown in FIG. 9, the mobile application server 162 can include one or more of the APIs 54 discussed above, which can implement the authentication and authorization SDK to integrate and interface with backend components for determining identity and entitlements.

Web application server 164 supports interactions using a website accessed by a web browser application 190 (see FIG. 10) running on the client device 12. It can be appreciated that the mobile application server 162 and the web application server 164 can provide different front ends for the same application, that is, the mobile (app) and web (browser) versions of the same application. For example, the enterprise system 16 may provide consumer and business banking applications that be accessed via a smartphone or tablet app while also being accessible via a web browser application 190 on any browser-enabled device. As shown in FIG. 9, the web application server 164 may also include one or more of the APIs 54 described above.

The client and financial data 18, 20 may be associated with users of the client devices 12 (e.g., customers of a financial institution). The financial data 20 may include any data related to or derived from financial values or metrics associated with customers of the enterprise system 16, for example, account balances, transaction histories, line of credit available, credit scores, mortgage balances, affordability metrics, investment account balances, investment values and types, insurance policies, insurability metrics, among many others. Other metrics can be associated with the financial data 20, such as financial health data that is indicative of the financial health of the users of the client devices 12. As indicated above, it can be appreciated that the client data 18 shown in FIG. 1 may include or be part of the financial data 20 held by the enterprise system 16 and is shown separately in FIG. 1 for ease of illustration and ease of reference herein.

Figure 10:
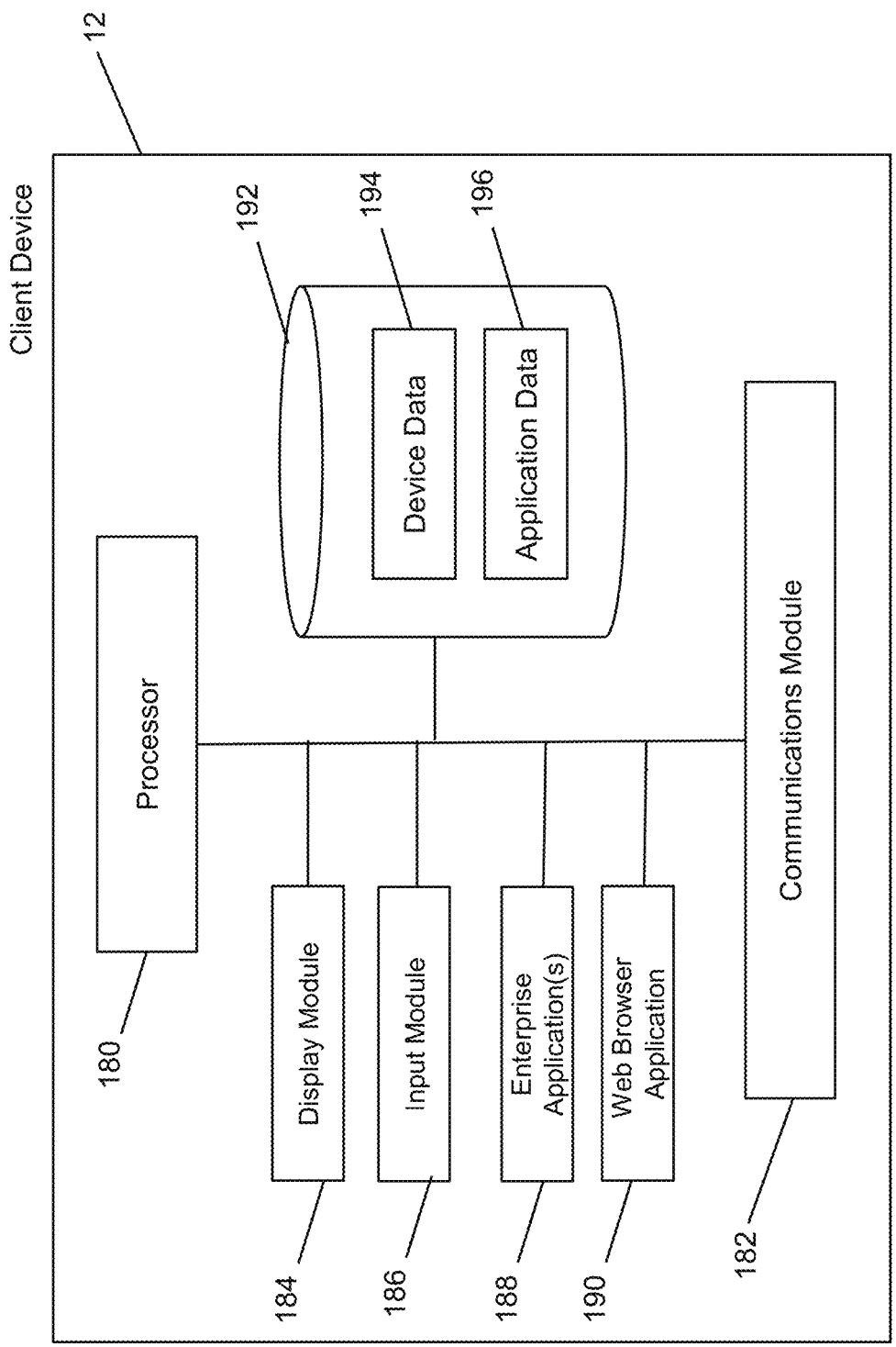
FIG. 10 is a block diagram of an example configuration of a client computing device associated with a user, customer, or client.

In FIG. 10, an example configuration of the client device 12 is shown. In certain embodiments, the client device 12 may include one or more processors 180, a communications module 182, and a data store 192 storing device data 194 and application data 196. Communications module 182 enables the client device 12 to communicate with one or more other components of the computing environment 8, such as the digital platform 28 or enterprise system 16, via a bus or other communication network, such as the communication network 14. While not delineated in FIG. 10, the client device 12 includes at least one memory or memory device that can include a tangible and non-transitory computer-readable medium having stored therein computer programs, sets of instructions, code, or data to be executed by processor 180. FIG. 10 illustrates examples of modules and applications stored in memory on the client device 12 and operated by the processor 180. It can be appreciated that any of the modules and applications shown in FIG. 7 may also be hosted externally and be available to the client device 12, e.g., via the communications module 182.

In the example embodiment shown in FIG. 10, the client device 12 includes a display module 184 for rendering GUIs and other visual outputs on a display device such as a display screen, and an input module 186 for processing user or other inputs received at the client device 12, e.g., via a touchscreen, input button, transceiver, microphone, keyboard, etc. The client device 12 may also include one or more enterprise applications 188 provided by the enterprise system 16, e.g., for performing mobile insurance, banking, or other financial product or services. The client device 12 in this example embodiment also includes a web browser application 190 for accessing Internet-based content, e.g., via a mobile or traditional website. The data store 192 may be used to store device data 194, such as, but not limited to, an IP address or a MAC address that uniquely identifies client device 12 within environment 8. The data store 192 may also be used to store application data 196, such as, but not limited to, login credentials, user preferences, cryptographic data (e.g., cryptographic keys), etc.

It will be appreciated that only certain modules, applications, tools and engines are shown in FIGS. 2 to 4 and 7 to 10 for ease of illustration and various other components would be provided and utilized by the digital platform 28, the authentication and entitlements system 10, the enterprise system 16, and client device 12, as is known in the art.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of any of the servers or other devices in the digital platform 28, the authentication and entitlements system 10, the enterprise system 16, and client device 12, or accessible or connectable thereto. Any application or module herein described may be implemented using computer readable/executable instructions that may be stored or otherwise held by such computer readable media.

Figure 11:
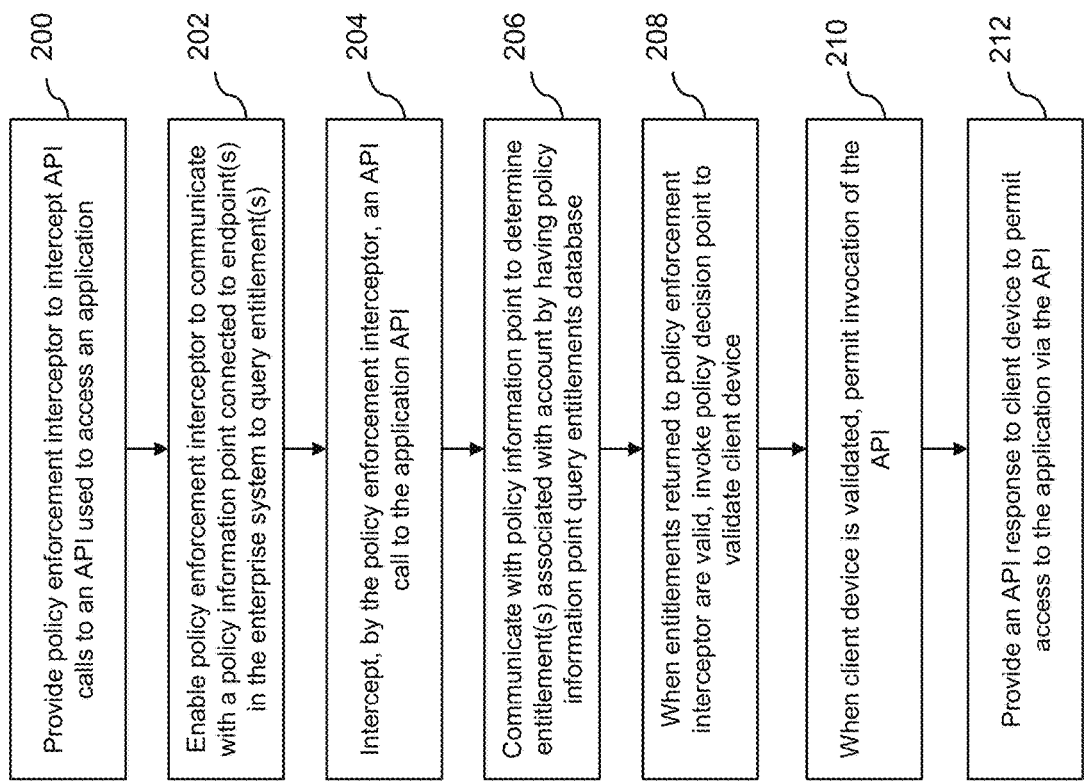
FIG. 11 is a flow diagram of an example of computer executable instructions for authenticating client devices communicating with an enterprise system.

Referring to FIG. 11, an example embodiment of computer executable instructions for authenticating client devices 12 communicating with an enterprise system 16 (e.g., via communication network 14) is shown. At block 200, a PEP 56 component is provided to intercept API calls to an API 54 used to access an application, e.g., an application or portion thereof for business banking. At block 202, the PEP 56 (also referred to as a policy enforcement interceptor) is provided or enabled to communicate with a PIP 60 or PIP API 64 (i.e., a PIP component) connected to one or more endpoints in the enterprise system 16 (e.g., the APIs/services shown in FIG. 7) to query entitlements. At block 204, the PEP 56 intercepts an API call to the application API 54 and, at block 206, communicates with the PIP 60 to determine entitlement(s) associated with an account. This can be done by having the PIP 60 query the identity and entitlements database 62 as shown in FIG. 5. At block 208, when the entitlements returned to the PEP 56 is/are valid, the PEP 56 invokes a PDP 58 to validate the client device 12. At block 210, when the client device 12 is validated, invocation of the API is permitted such that at block 212, an API response is provided to the client device 12 to permit access to the application via the API 54. It can be appreciated that the operations shown in FIG. 11 can also include an underlying OAuth token secured by an encrypted communication channel such as TLS to provide immutable entitlements data.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A server device for authenticating client devices communicating with an enterprise system, the server device comprising:
   a processor;
   a communications module coupled to the processor; and
   a memory coupled to the processor, the memory storing computer executable instructions that when executed by the processor cause the processor to:
      provide a policy enforcement interceptor (PEI) to intercept application programming interface (API) calls to an API used to access an application, and enable the PEI to communicate with a policy information point (PIP);
      intercept, by the PEI, an API call to the API;
      communicate with the PIP to request entitlements of an account associated with the intercepted API call;

obtain, by the PIP, via an encrypted communications channel, the requested entitlements from an entitlements database;

provide the PEI, via the PIP, with the requested entitlements;

determine, with the PEI, whether the requested entitlements have been altered;

invoke a policy decision point (PDP) for unaltered entitlements to validate that the account has access privileges to complete the API call; and in response to validation by the PDP, permit invocation of the API to access the application.

2. The server device of claim 1, wherein the PEI, the PIP, and the PDP are each provided as modules in a plurality of APIs used to access corresponding ones of a plurality of applications accessible to the client device.

3. The server device of claim 2, wherein the PIP is deployed using a software development kit (SDK).

4. The server device of claim 1, wherein the PIP is provided as a separate service from the API used to access the application.

5. The server device of claim 4, wherein the PIP is configured to serve a plurality of APIs used to access corresponding ones of a plurality of applications accessible to the client device.

6. The server device of claim 1, wherein communications to and from the PEI, the PIP, and the PDP are secured by the encrypted communications channel and authorization security tokens.

7. The server device of claim 1, wherein the computer executable instructions further cause the processor to update the entitlements database.

8. The server device of claim 1, wherein the PEI communicates with an API controller for the application to obtain an appropriate API response to the API call to permit invocation of the API.

9. The server device of claim 1, wherein the PIP utilizes a data model populated using a set of different views, the set of different views structured to include data elements according to a policy evaluation required.

10. The server device of claim 1, wherein a database for managing entitlements in communication with the PIP comprises entitlements for the client device that correspond to a plurality of organizational units.

11. A method of authenticating client devices communicating with an enterprise system, the method executed by a server device and comprising:

providing a policy enforcement interceptor (PEI) to intercept application programming interface (API) calls to an API used to access an application;

enabling the PEI to communicate with a policy information point (PIP);

intercepting, by the PEI, an API call to the API;

communicating with the PIP to request entitlements of an account associated with the intercepted API call;

obtaining, by the PIP, via an encrypted communications channel, the requested entitlements from an entitlements database;

providing the PEI, via the PIP, with the requested entitlements;

determining, with the PEI, whether the received entitlements have been altered;

invoking a policy decision point (PDP) for unaltered entitlements to validate that the account has access privileges to complete the API call; and in response to validation by the PDP, permitting invocation of the API to access the application.

12. The method of claim 11, wherein the PEI, the PIP, and the PDP are each provided as modules in a plurality of APIs used to access corresponding ones of a plurality of applications accessible to the client device.

13. The method of claim 11, wherein the PIP is provided as a separate service from the API used to access the application.

14. The method of claim 13, wherein the PIP is configured to serve a plurality of APIs used to access corresponding ones of a plurality of applications accessible to a client device.

15. The method of claim 11, wherein communications to and from the PEI, the PDP, and the PIP are secured by the encrypted communications channel and authorization security tokens.

16. The method of claim 11, further comprising update the entitlements database.

17. The method of claim 11, wherein the PEI communicates with an API controller for the application to obtain an appropriate API response to the API call to permit invocation of the API.

18. The method of claim 11, wherein the PIP utilizes a data model that is populated using a set of different views, the set of different views structured to include data elements according to a policy evaluation required.

19. The method of claim 11, wherein a database for managing entitlements in communication with the PIP comprises entitlements for the client device that correspond to a plurality of organizational units.

20. A non-transitory computer readable medium for authenticating client devices communicating with an enterprise system, the computer readable medium comprising computer executable instructions for:

providing a policy enforcement interceptor (PEI) to intercept application programming interface (API) calls to an API used to access an application;

enabling the PEI to communicate with a policy information point (PIP);

intercepting, by the PEI, an API call to the API;

communicating with the PIP to request entitlements of an account associated with the intercepted API call;

obtaining, by the PIP, via an encrypted communications channel, the requested entitlements from an entitlements database;

providing the PEI, via the PIP, with the requested entitlements;

determining, with the PEI, whether the received entitlements have been altered;

invoking a policy decision point (PDP) for unaltered entitlements to validate that the account has access privileges to complete the API call; and in response to validation by the PDP, permitting invocation of the API to access the application.

* * * * *